United States Patent [19]

Bischoff, Jr.

[11] 4,017,189
[45] Apr. 12, 1977

[54] TESTING OF AUTOMOBILE HEADLIGHTS

[76] Inventor: Robert F. Bischoff, Jr., 30 Fairmount Ave., Morristown, N.J. 07960

[22] Filed: May 20, 1975

[21] Appl. No.: 579,237

[52] U.S. Cl. .............................. 356/121; 340/38 P
[51] Int. Cl.² ...................... G01S 9/02; G01J 1/00
[58] Field of Search ........... 356/121, 122, 72, 256; 250/216; 343/6 R; 240/7.1 LJ, DIG. 6; 340/38 P

[56] References Cited

UNITED STATES PATENTS

| 2,261,741 | 11/1941 | Mathieu | 356/121 |
| 2,598,794 | 6/1952 | Holmes | 356/121 |
| 2,956,117 | 10/1960 | Ernst et al. | 343/6 R |

OTHER PUBLICATIONS

Automotive Engineering, "Whats Ahead in Automotive Lighting", Automotive Engineering, 10/1974, pp. 50–56.
*Ingenieur* (Netherlands), vol. 85, No. 4, pp. 64–70, 1/25/73.
Mortimer, R. G., "Some Effects of Road, Truck & Headlamp Characteristics on Visibility & Glare in Night Driving" Soc. of Automotive Eng., West Coast Meeting, Anaheim, Calif., 8/12-16/74.

*Primary Examiner*—John K. Corbin
*Assistant Examiner*—Wm. H. Punter

[57] ABSTRACT

A machine which surveys the focussing of motor vehicle headlights, said surveying accomplished by the invented machine using an existing light-sensitive element and in correlation with a radar detecting system.

1 Claim, 6 Drawing Figures

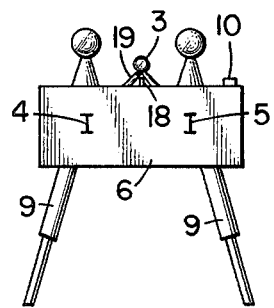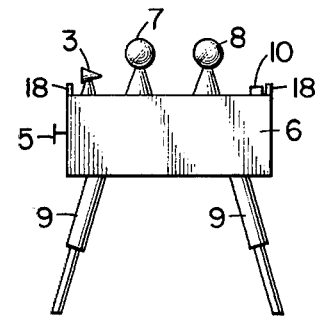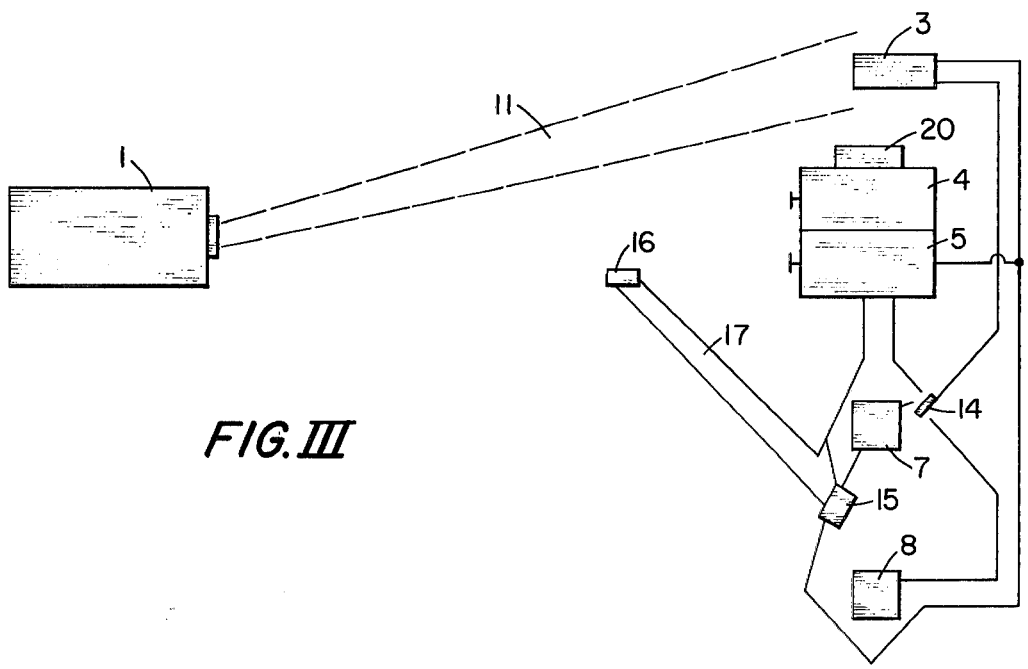

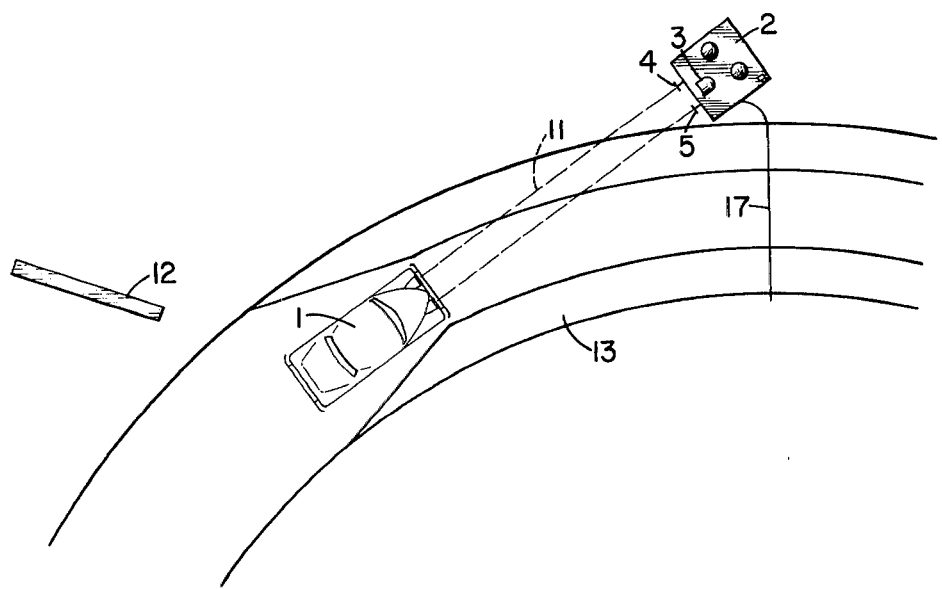
FIG. IV
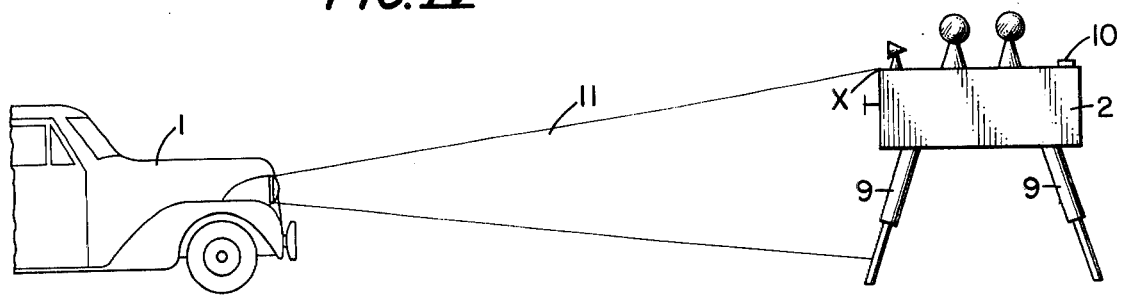
FIG. V
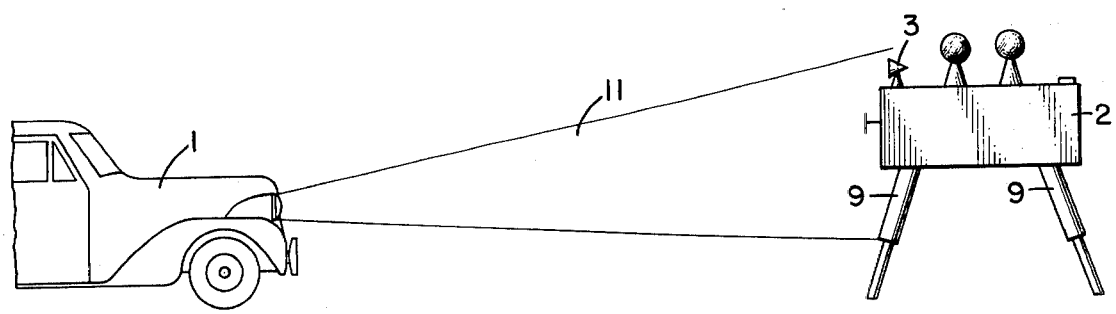
FIG. VI

TESTING OF AUTOMOBILE HEADLIGHTS

This invention is a machine which is not only capable of surveying the focussing of headlights on vehicles, but of surveying any group of light-focussing systems when such surveying is needed.

It is a known fact that many vehicles on the roadway are traveling with their headlights out of focus, and said out-of-focus headlights become a hazard to other motorists and to pedestrians.

The National Safety Standards for motor vehicle headlight focussing are kept enforced, but only when said vehicles are presented yearly, in most states, for the state vehicle inspection. This yearly lapse results in a 12-month period during which headlight focussing of motor vehicles goes uncontrolled without any policing.

The object of this invented machine is to police the focussing of motor vehicle headlights so that such policing will keep the headlights of vehicles in focus year-round.

There are numerous reasons why motor vehicle lights go out of focus: lights may be out of focus as a result of natural vibration which the vehicle receives when it is in use; the vehicle may have been involved in an accident which caused the lights to go out of focus, and a good length of time could elapse before attention is given to the said vehicle, even though it may be used daily on the roadways; or another fairly common reason why lights may be out of focus is because a vehicle, particularly a car, may have a great amount of weight in its trunk. Said weight then alters the horizontal elevation of the car resulting in its headlights going out of focus because the said weight causes the back to go down and the front to be raised higher than the back, causing the headlights of the said car to focus higher than normally is permitted. Such higher focussing in turn, develops a hazard to other motorists and to pedestrians.

The size of the invented machine's housing may vary, but should be of a size which is practical and economical for the containment of the particular component parts comprising the said machine. The shell and the inner section of the housing consist of a reinforcing element which gives strength to the said housing, so that when the equipment is placed inside the housing, said housing is durable enough to withstand mounting and usage without damage to the said equipment.

The power source can be an AC connection to a municipal street lighting system, or it can be a DC connection from a storage battery connected in or by the invented machine, with a generator to keep the said battery charged. The engery source is not paramount since the said machine can be adapted to either AC or DC power source.

This invented machine is described in greater detail, along with other objectives and advantages, in the following portions of this specification, which said specification will best be understood by referring to the accompanying drawings. Said drawings consist of figures depicting the said invented machine with its parts, and of figures which show the machine in position for observation of the focussing of vehicle headlights.

Referring to the drawings:

FIG. I is a front view of the invented machine.
FIG. II is a right side view of the machine.
FIG. III is a block diagram showing the principal parts of the machine.
FIG. IV shows the position of the invented machine, when said machine is surveying a vehicle on the roadway
FIG. V shows the position of the vehicle and of said vehicle's headlight light rays being received and surveyed by the machine.
FIG. VI shows the machine's reception of the vehicle headlight light rays when said rays focus higher than the normal set standard.

FIG. I shows the front of the machine with the light-sensitive cell 3 and the radar transmitter 4 and radar receiver 5. Mounted on top of the machine is the level 10, and depicted extending from each corner of the housing 6 are the extendible legs 9.

FIG. II is a right side view showing the light-sensitive cell 3, green light 7, red light 8, and level 10, all mounted on top of the housing 6 of the machine. Also shown is the overall housing 6 and extendible legs 9, as well as the radar receiver 5, which said receiver receives the signal sent out by the transmitter and deflected by the vehicle which is the target.

FIG. III is a diagram of the circuitry of the machine showing the pricipal parts. The light-sensitive cell 3, when activated by the rays of light 11 from the vehicle 1, activates the circuit which opens the electromagnet 14, and allows passage of current through the system to and through the red light 8, activating the relay 15, which completes the circuit so that the red light 8 is activated. It is understood that in place of the said red light or the green light, an audio mechanism such as a bell can be used, or both the visual light/s and the audio mechanism can be used in conjunction. FIG. III also shows the power source 20.

The circuitry of the machine is dual, so that when the electromagnet 14 is not activated, and the position of said electromagnet stays closed, this closed position prevents a complete circuit from being formed on the circuit to the red light 8, so that upon the activation of current caused by a signal from the radar transmitter-receiver antennae 4, 5, and without any signal from the light-sensitive cell 3, the current will only pass along the circuit connected with the green light 7, causing the relay to be activated, and completing the circuit, thereby activating the green light 7.

In FIG. III, the hose 17 containing the switch 16, when passed over by a vehicle, is activated so that the said switch 16 deactivates the relay 15. When either of the dual circuits connected to the dual light systems are activated, the relay 15 will go into an active position, which said position it will maintain until said relay is deactivated by a vehicle's passing over the hose 17 connected to the switch 16 causing a deactivation, said deactivation causing either light to go out.

FIG. IV depicts a top view of a vehicle 1 in position when said vehicle becomes subject to surveying by the machine 2. It is also understood that the driver of the car is considered the focuser because while driving his car, he is the one doing the focusing of the headlights. Since the machine must be positioned so that it focusses on the front center of the target vehicle 1 when it is surveying said vehicle, the machine must be positioned so that it is able to focus on the said front center when the vehicle 1 is moving on a roadway. This focussing on the target vehicle is accomplished because the machine is placed so that it focusses on a vehicle when said vehicle is moving on a roadway in which there is a curve 13, and said vehicle is on this curve 13. Even though degrees in curves in a roadway give different variations in distances between the said target vehicle 1 and the machine 2, said machine is adaptable to take into account these variations in distances. FIG. IV also shows the deactivating hose 17.

When setting the machine, a vehicle is placed, for this purpose, in the pathway of the proposed traffic to be surveyed. Referring to FIGS. I and II, the invented machine housing has developed upon it a sighting mechanism 18 which allows for the machine to be sighted onto the target vehicle. This sighting mechanism is a peep sight or an open sight built on the outer top of the machine housing in the center. One sight is located in the back center top of the housing, and one sight is in the front center top of the housing. It is understood that the light-sensitive cell is mounted on an open base so that sighting is obtained through said opening (FIG. I-19). As the target vehicle is placed on the road, this said sight is used to align the machine with the vehicle, by aiming the sight at the vehicle. The most beneficial target area for which to obtain such sighting of the vehicle is the center base of the front windshield, since this area is the range beyond which the headlights of the vehicle should not reach in order to be properly focussed. However, due to many variables, such as, the terrain on which the vehicles to be surveyed are traveling, which might give a different elevation to the rays of light from the vehicle headlights, true aligning should be decided by each user at the site on which the machine is placed.

In a vehicle headlight controls system already in use, there is a light-sensitive cell, which said cell, when activated by the illumination of the lights from an oncoming vehicle, activates the system so that an electromagnet connected with the source of electrical energy in the system, operates a dimmer switch. As a result, the headlight focussing of the car equipped with this said system is changed from high to low beam.

This light-sensitive cell is the kind used in this invented machine. Said cell activates the ciruitry of the machine when light focusses on it. When this light activates one of the circuits of the machine; namely, the red light circuit, said activation gives a warning to the driver or the observer that said light is out of focus. The cell is positioned so that it receives the rays of light from a headlight only when a passing vehicle has a headlight out of focus.

Another mechanism already in existence, which is used in correlation with the said invented machine, is the radar indicator system, which said system indicates an object going through its radar "net". This radar system is used so that each vehicle passing by the surveying site is recorded, not only those vehicles with improperly focussed light.

FIG. IV shows the transmitting antenna 4 of said radar system, which said transmitting antenna sends out signal waves. The receiving antenna 5 of this system receives the echo back from the target vehicle 1. Upon the reception of this echo, the receiver 5 indicates that a vehicle is passing by activating the green light, which said green light has circuitry connected to the radar system. When the passing vehicle 1 indicated by this radar system has lights which aren't focussing high, only the green light system is activated.

Obviously, a vehicle might have lights which are out of focus, but which aren't necessarily out of focus by being too high. This machine, however, is used only to indicate high focussing of lights, which said high focussing poses the greatest danger to other passing vehicles, to vehicles in front, and to pedestrians.

Vehicles which pass by the machine and do have high focussing headlights are so indicated by the activation of the red light circuitry. This red light is activated when the light-sensitive cell receives illumination from the high focussing headlight, thereby becoming energized as the radar scanning system reads a target object. The energizing of the said cell activates only the circuitry of the red light, giving the observer or the driver the indication that the vehicle headlights are focussed too high.

FIG. V shows the vehicle 1 with its headlights focussing on the invented machine 2. The rays of lights 11 from the headlights of the vehicle 1 do not focus higher than the approved area for vehicle headlights, and thus, FIG. V shows the rays of light 11 when in standard focus according to height.

The elevation of the vehicle in relationship to the elevation of the machine is of paramount importance, because an imporperly positioned machine will give an improper performance.

The vehicle 1 being surveyed by the machine must be on a level plane, such as a level roadway. The elevation of the machine 2 must correlate with the level of the vehicle standard for headlights. Point $x$ in FIG. V is that point which is considered to be the highest point for proper headlight focussing. Therefore, lights in proper focus must not focus beyond this point $x$. As described, this machine has used a setting in relationship to this said point $x$ in FIG. V, and though this setting is advantageous to the use of the machine, it is understood that this machine can be adapted to other settings when needed for different observations.

Since the vehicle must be on a level plane, the variable in the correct elevating of the machine is the elevation of the said machine, since the terrain on which it is placed might not be a level plane. In this case, the extendible legs 9 would then be positioned so that the machine 2 is at a height needed for the said machine to be level, and simultaneously, be at the proper heighth for the focussing of vehicle headlights. If a permanent base is used, said base would be constructed considering the leveling and elevation position mentioned, which is necessary for the machine in relationship to both the vehicle 1 and to the terrain on which it is placed.

In most cases, the machine will be a permanent fixture with a permanent base, but in some cases, the said machine will be more adaptable by being portable, and in these cases, the adjustable extendible legs would be more suitable.

In order to exactly level the said machine, a water level (FIG. II-10) with a bubble or a similar type level, is used. When leveling this machine in the place it is to be used, it might be found that the level 10 would be more advantageously positioned on the housing of the machine if said level is placed in a different position that the position shown in FIG. II, and such different positioning is at the discretion of the person doing the work. It might also be found that more than one level is needed, and if so, other levels can be added on the corners of the housing or in other area in order to obtain perfect leveling of the said machine. If a permanent base is used, a smaller adjustable element may be added to the housing in place of the legs 9 in each corner, said element for the adjustment of the machine while said machine is in use.

FIG. IV 11 shows the main focal points from the headlights designated by lines. These said lines 11 hit the machine 2 on either side of the light-sensitive cell 3. Since FIG. IV shows a vehicle 1 in motion, and in the process of being observed, it is obvious that the right side headlight of the said vehicle 1 has already been surveyed, and that the left side headlight of the vehicle will be surveyed next. Thus, it is understood that both headlights will be observed or surveyed by the mounting of only one light-sensitive cell 3. It is apparent, therefore, that the vehicle must be surveyed on a curve 13 in order to survey both headlights with only one cell.

The machine is so constructed that it will be activated by either one out-of-focus headlight, or by both lights being improperly focussed. All that is necessary for the activation of the said machine's red light is that a light ray focus so that said light ray hits the light-sensitive cell. Once the red light shows on the machine for a particular vehicle, it means that the light/s of said car is/are in violation of the Safety Standards.

Once it is activated, the red light stays on until the vehicle passes over the hose, which is connected to the machine, and goes across the roadway as shown in FIG. III 17. This said hose contains within it a switching mechanism (FIG. III–16), which said mechanism deactivates the machine mechanically, clearing said machine of the reading from a particular vehicle. The distance between the vehicle and the hose should be established at the particular site where the machine is being used, because curve construction varies. To best suit the efficient operation of the machine, said hose is placed so it will be in front of the vehicle after said vehicle is observed, but at a distance so as to permit time for the driver or observer to get a reading from the said machine before the red or green light is deactivated.

It is obvious that the rate of cars cannot be too rapid because no readings will benefit any one automobile, though a step-up rate of reading could be initiated by furthering the automation of the invented system. The distance between a vehicle being surveyed and one coming up to be surveyed, should be twice the distance between the car being surveyed and the said hose, in order to give sufficient time for those observing to take the readings. The rate of speed of the passing vehicles should be slow enough to allow also for proper observation by all parties.

In FIG. IV, a sign 12 is depicted placed along the roadway well in advance of the actual surveying area of the machine to allow the motorist to prepare himself for the testing of his headlights. Obviously, a multiple of signs can be used. A single land of traffic is needed and a rate of speed can be established which best suits the area. It is obvious also that the low beams of the headlights must be on, otherwise, the high beams would activate the light-sensitive cell, and thus the machine, which has been set for reading the low beams of the said headlights.

FIG. VI shows the machine 2 in receivership of the out-of-focus vehicle headlight rays 11. In the situation depicted in FIG. VI, the vehicle's lights are on low beam, but the focus of the said headlights is too high, which, in normal situations, is a violation of the Safety Standards. With the headlights thus out of focus, said lights then shine on the lihgt-sensitive cell 3, activating said cell, and thereby the red light. Also shown in FIG. VI are the extendible legs 9 on the machine 2. These legs extend and adjust according to the terrain on which the said machine is placed, although as has been mentioned previously, the said machine can be mounted in other ways, an said mounting may be a permanent foundation of stone or other construction material.

Although but a single embodiment of my invention has been illustrated and described, it is apparent to those skilled in the art that in addition to the differences noted herein, various other changes and modifications may be made therein without departing from the spirit of the invented machine or from the scope of the appended claims.

I claim:

1. A surveying apparatus for the observation of headlights, where there is proper placement of the said apparatus for proper alignment of the apparatus to the headlights of moving vehicles and where the said apparatus is a receiving instrument which gives indications to the focuser of the headlights that the focusing of said headlights is either proper or improper, and where the said apparatus is so developed that a radar and a photocell activate the said apparatus, and where such activity shows through indicators whether the focusing of the headlights is regular or irregular, said apparatus comprising and functioning as follows:
    1. an apparatus which possesses adjustable legs, an aiming device, and a leveling device so that said machine is able to be positioned for proper observation;
    2. said apparatus is placed in an applicable location so that the apparatus is well able to observe the focusing of headlights;
    3. a posting of notice signs prior to the reaching of the site of the apparatus, said posting is a notification that there is to be an inspection of vehicle headlights;
    4. said apparatus containing a radar system and indicating means, which said radar system is able to transmit and receive so that the apparatus, through said indicating means, is able to show that a vehicle is present;
    5. said apparatus further contains a photocell system which receives irregular headlight rays from a particular vehicle, and activates further indicating means which upon reception of irregular rays, indicates that the alignment of the light rays are irregular;
    6. said apparatus incorporates a switch, which said switch deactivates the apparatus when the vehicle being observed runs over the switch.

* * * * *